(No Model.)

C. W. PRESCOTT.
Mirror Hanger.

No. 234,609. Patented Nov. 16, 1880.

Witnesses:

Inventor:
Charles W. Prescott,
By his attorney,
J. S. Brown

UNITED STATES PATENT OFFICE.

CHARLES W. PRESCOTT, OF FRANKLIN, NEW HAMPSHIRE.

MIRROR-HANGER.

SPECIFICATION forming part of Letters Patent No. 234,609, dated November 16, 1880.

Application filed March 31, 1880. (No model.)

*To all whom it may concern:*

Be it known that I, CHARLES W. PRESCOTT, of Franklin, in the county of Merrimack and State of New Hampshire, have invented an Improved Mirror-Hanger; and I do hereby declare that the following is a full and exact description thereof, reference being had to the accompanying drawings, making part of this specification.

Figure 1:
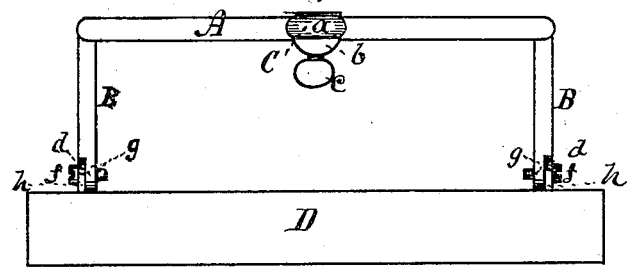
Figure 2:
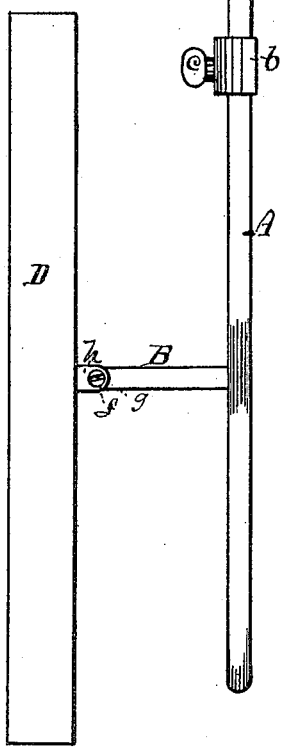
Figure 3:
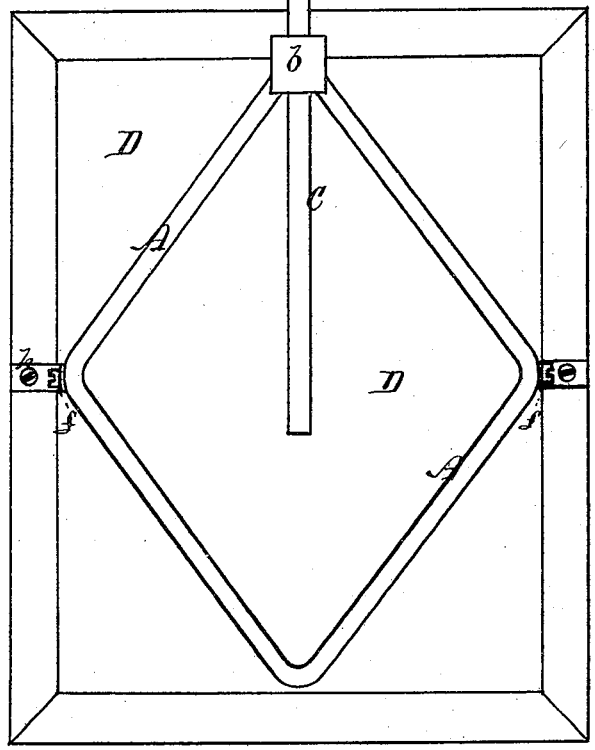

Figure 1 is a top view of the mirror-hanger with a mirror attached thereto; Fig. 2, a side view thereof; Fig. 3, a rear view of the same.

Like letters designate corresponding parts in all of the figures.

My invention consists in an improved mirror-hanger for suspending mirrors from walls, possessing the capabilities of adjustment up and down to suit different heights of person, of adjustment to different angular positions and retention in those positions, and of holding the mirror firmly supported to the wall or surface against which it is hung, in whatever position it may be.

The mirror-hanger is composed of a frame or body, A, of the form substantially as shown, or any equivalent shape, two supporting arms or bearings, B B, extending forward from the sides of the frame A, near the middle thereof, and a suspension rod or bar, C, upon which the upper part of the frame or body slides or moves for adjustment up or down.

The suspension-rod C is provided with an eye, loop, or hook, $a$, by which to suspend the whole from a nail, screw, pin, or hook secured to the wall or other surface in front of which the mirror is to be suspended.

The body A has a vertical hole, socket, or other way, $b$, which embraces the rod C, so as to slide up or down thereon and be supported or sustained thereby; or any suitable sliding connection may be formed between the two parts. A set-screw, $c$, or its equivalent, inserted in the socket of the body A, serves, by tightening against the rod C, to hold the body at any height on the said rod to which it may be adjusted. I do not confine myself to any special means for this connection of the two parts and the adjustment of the body.

The supporting arms or bearings B B extend forward from the body or frame A far enough to allow as much angular movement of the mirror D as may be desired. They have in their forward ends, respectively, screw-holes $d\ d$, through which screw-pivots $f\ f$ are inserted, and through holes $g\ g$ in ears or bearings $h\ h$ on the back side of the mirror, or otherwise, to effect the same purpose. By these means, or the equivalent thereof, not only is the mirror pivoted to the hanger, so that it may be placed in any angular position desired, but by properly or sufficiently tightening the pivot-screws $f\ f$ in the bearings B B it is held securely in any position in which it may be placed or to which it may be adjusted.

The frame or body A extends downward below the bearings B B, on which the mirror is mounted, for the purpose of holding the hanger steadily back against the wall, in whatever position the mirror may be placed, and preventing the mirror from pulling forward. To produce the best effect the body should extend downward as far as the mirror, or nearly so. The width of the frame also prevents any lateral unsteadiness of the mirror.

What I claim as my invention, and desire to secure by Letters Patent, is—

A mirror-hanger composed of a body, A, provided with forwardly-projecting bearings B B at its sides, and with a downwardly-projecting part below the said bearings, and of an adjustably-sliding suspension-rod, C, substantially as and for the purpose herein specified.

The foregoing specification signed by me this 26th day of February, 1880.

CHARLES W. PRESCOTT.

Witnesses:
W. M. BARNARD,
FRED BLANCHARD.